Feb. 21, 1956
D. ATLAS
2,736,020
ARAC-AUTOMATIC RAIN ATTENUATION CORRECTION
Filed Sept. 22, 1950
4 Sheets-Sheet 1
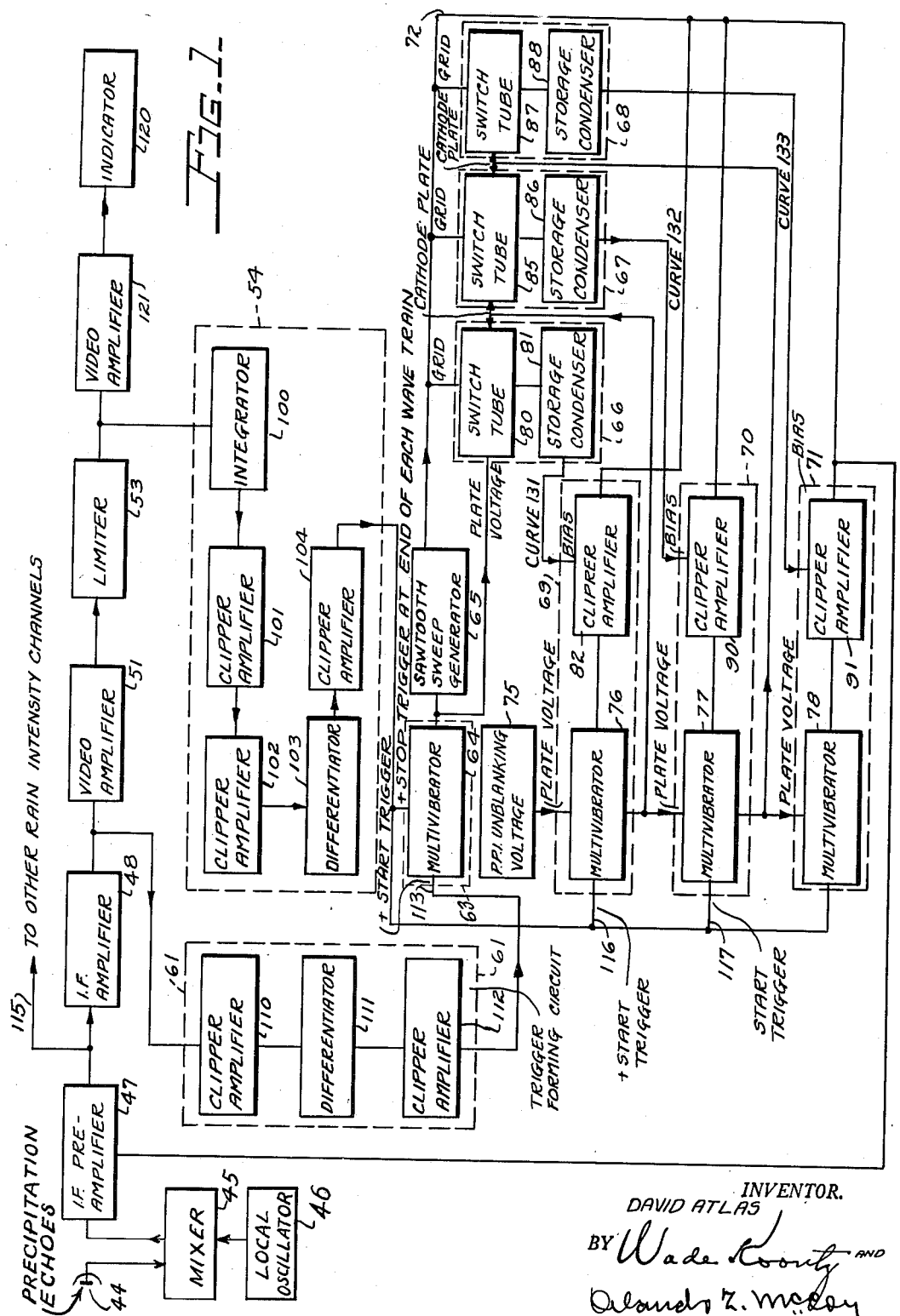
INVENTOR.
DAVID ATLAS
BY Wade Koontz AND
Orlando Z. McCoy
ATTORNEYS

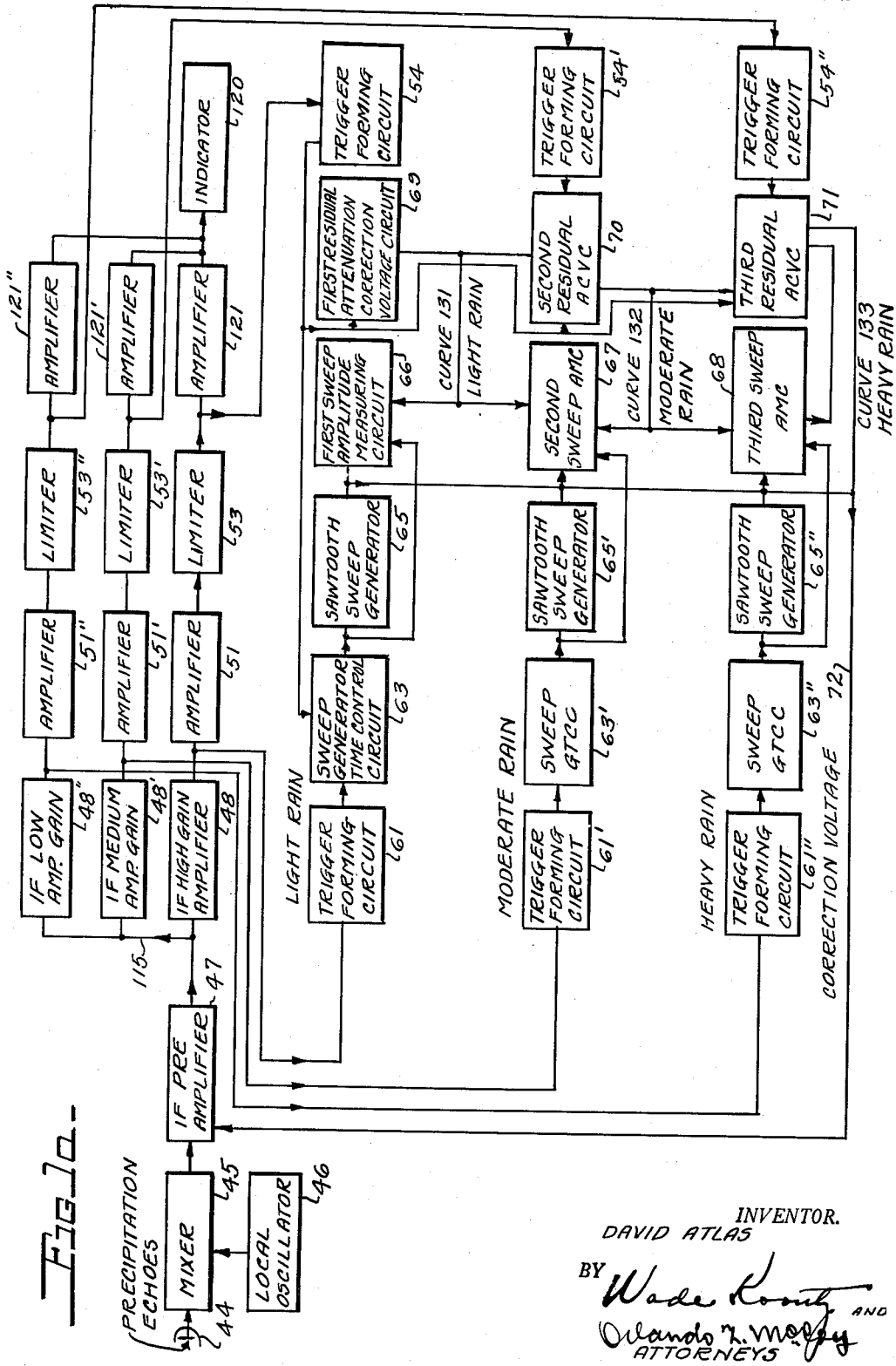

Feb. 21, 1956

D. ATLAS 2,736,020

ARAC–AUTOMATIC RAIN ATTENUATION CORRECTION

Filed Sept. 22, 1950

RAINFALL ATTENUATION CORRECTION SIGNALS

INVENTOR.
DAVID ATLAS
BY Wade Koontz AND
Orlando R. McCoy
ATTORNEYS

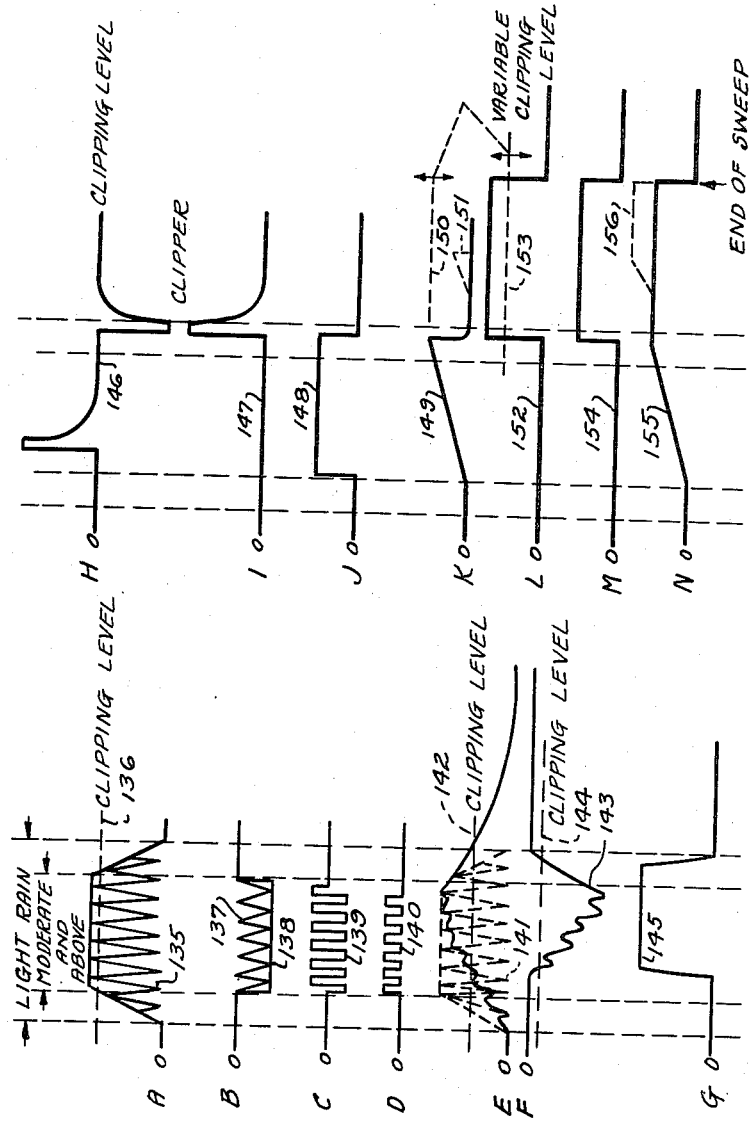

United States Patent Office 2,736,020
Patented Feb. 21, 1956

2,736,020
ARAC—AUTOMATIC RAIN ATTENUATION CORRECTION

David Atlas, Newton Center, Mass.

Application September 22, 1950, Serial No. 186,298

4 Claims. (Cl. 343—17.1)

(Granted under Title 35, U. S. Code (1952), sec. 266)

The invention described herein may be manufactured and used by or for the Government for governmental purposes without payment to me of any royalty thereon.

This invention relates to automatic rain attenuating correction for radio and radar signal values and more particularly to a means and a method therefor.

The past practices in radar transmission have suffered as a limitation thereof, the attenuation of radar transmitted signals by rain in a magnitude proportional to the rain intensity. The magnitude of the attenuation of radar echo or returned signal is also proportional to rain intensity.

The present invention is directed toward the use of radar signals to indicate true theoretical values of rain intensities arrived at by making corrections for the attenuation effects of the rain intensities. The signal echoes from the front edge of a storm are not affected by rain attenuation and hence are used herein to correct for the subsequent echoes. In exercising the present invention a series of corrections of this nature are used throughout a storm to indicate the true values of rain intensities. The circuit described herein is applied to two radar sets on opposite sides of a rain storm so that true values of the rain attenuation factor therebetween may be determined as that value which shows the same rainfall distribution at the two radar sites. The present invention is directed toward the minimizing of or the elimination of the distortion effects in radar rain distribution charts made from a single radar set in providing true pictures of rain distribution in storms, for use in flood warning forecasts, in determining the physical structure of storms for hazard avoidance by aircraft pilots, for rsearch purposes and the like.

An object of the present invention is to provide a means and a method for minimizing the element of attenuation in the measuring or the making of determinations of the magnitude of liquid water content and its distribution in the atmosphere during storm conditions to provide a storm contour map for use by an aircraft pilot in avoiding the core of a storm of maximum water content in directing the flight path of the aircraft that he is piloting.

Another object is to provide a means and a method for minimizing attenuation effects of water particles suspended in air upon radio and radar signals by a series of approximations made with a radar set.

Another object is to provide a unique amplitude channeling circuit and a sensitivity time control circuit for effectively measuring the intensity of precipitation.

A further object is to provide a circuit applying a correction signal to an initial amplifier to which a measured precipitation rate signal is applied for over-amplifying the signal as much as it is supposedly attenuated by propagation through the rain of the intensity value measured by the radar.

Another object is to provide a unique method for maintaining a correction in range as long as the signal propagates through rain of the measured value and for maintaining the proper total correction beyond the rain area so that other targets beyond the storm are displayed at proper amplitude.

Another object is to provide a novel technique for correcting for more than one rainstorm along a single path.

The present invention permits radar signals from rain and targets blocked by rain to be displayed at a level directly proportional to the reflectivity of the rain or target and thereby faithfully represent the structure of the actual rainstorm even at frequencies which are effected by rainfall attenuation.

With the above and other objects in view, an illustrative embodiment of the present invention is shown in the accompanying drawings wherein:

Fig. 1 is a block diagram of a fragmentary radar circuit that embodies the present invention;

Fig. 1A is a three channel labeled circuit block diagram of the unlabeled blocks shown in dash lines in Fig. 1;

Fig. 3 is a plurality of wave forms appearing in the circuit shown in Fig. 1.

Figure 2:
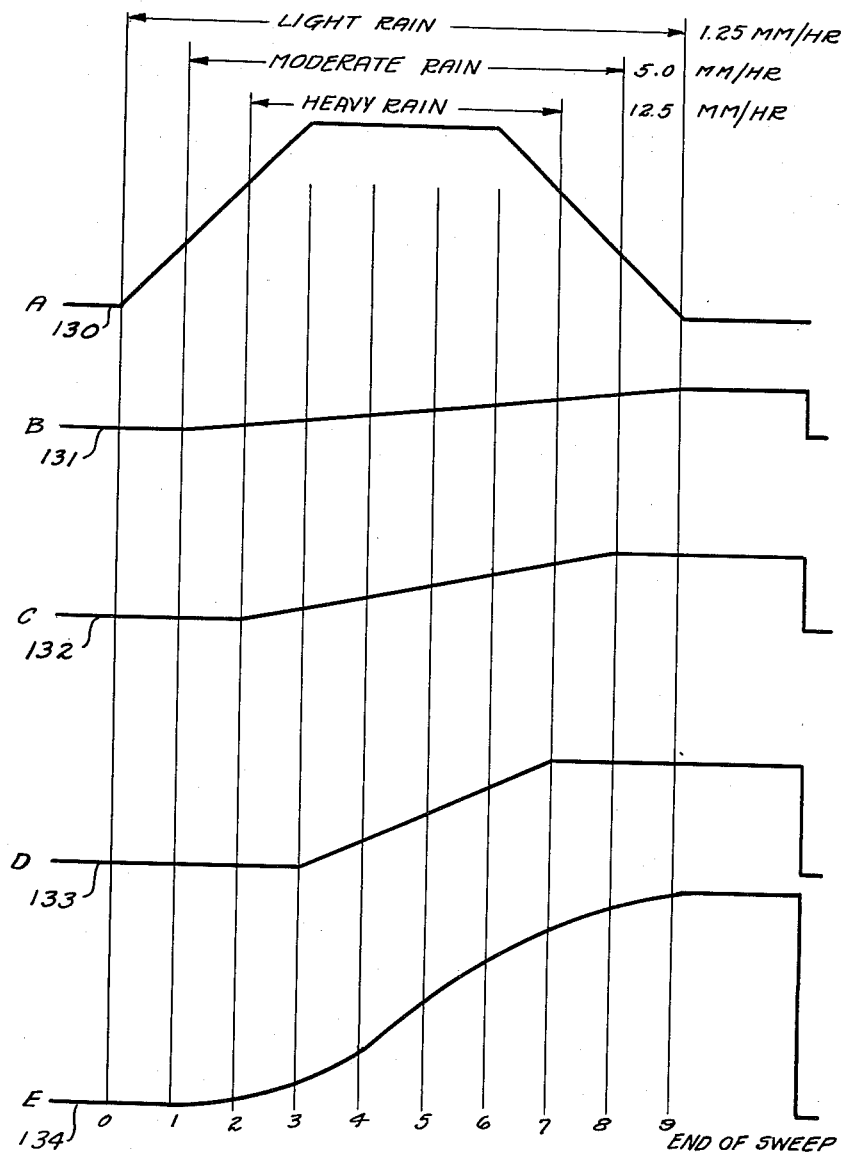
Fig. 2 is a plurality of wave forms appearing in the circuit shown in Fig. 1.

In the accomplishing of the present invention an assumption is made of a known value of attenuation per kilometer of penetration per millimeter per hour of rainfall, or a known mean value for various ranges of rain intensity is assumed.

Based upon the above assumption circuitry disclosed in the accompanying drawings is operated in such a manner as to divide the storm into divisions of rain intensities and to measure the rainfall in the nearer part of the storm not affected by attenuation, and increase the indicated intensity of the rainfall in the next division by the same percentage as the attenuation of the intervening rain reduced it. The radar receiver then effectively indicates the correct rainfall value in the second division and increases the indicated value in the following rainfall range as much as it was attenuated by the rainfall of the first two divisions. In this manner the series of approximations continues until all echoes are over-amplified as much as they were attenuated.

A circuit modified for operation in making such a series of approximations is shown in block diagram in Fig. 1 of the accompanying drawings. Echo signals from the rain drops in the storm are intercepted by an antenna 44, beat in a mixer 45 against the frequency output from a local oscillator 46 to provide an intermediate frequency that is passed to an I. F. preamplifier 47. In the circuit there shown, a wave train in the intermediate frequency or I. F. pre-amplifier 47 is passed illustratively of the above 3 divisions of rain or rainfall intensities through an intermediate frequency or I. F. amplifier 48 from which it is divided, passing to both a video amplifier 51 and to a first trigger forming circuit 61. The video amplifier 51 is connected through a limiter 53 and a second trigger forming circuit 54 to the same sweep generator time control circuit 63 to which output from the first trigger forming circuit 61 is applied. Corresponding other channel components 61, 63 and 54 are primed or double primed to indicate their respective channel associations.

Output from the sweep generator time control circuit 63 is passed to both a sawtooth sweep generator 65 and, as plate voltage, to a first sweep amplitude measuring circuit 66 for a first intensity storm. Output from the sawtooth sweep generator 65 is applied in common to each of three sweep amplitude measuring circuits 66, 67 and 68 for a first, second and third division of rain intensities in the storm, respectively, to residual attenuation correction voltage circuits 69, 70 and 71 for the first, second and third intensities of storms, respectively, and back to the intermediate frequency or I. F. preamplifier 47. Output from the three sweep amplitude measuring circuits 66, 67 and 68 are passed to the three residual attenuation correction voltage circuits 69, 70 and 71 for the three storms, respectively. Output from the second trigger forming circuit 54 is also applied in common to the three residual attenuation correction voltage circuits 69, 70 and 71.

A plan position indicator or P. P. I. unblanking voltage 75 is passed in series to multivibrators 76, 77 and 78 as plate voltage therefor. Plate voltage for the multivibrator 77 is applied in common to the cathode of a switch tube 80 in the first sweep amplitude measuring circuit 66. The switch tube 80 is connected to a storage condenser 81 that passes its output to a clipper amplifier 82 in the first residual attenuation correction voltage circuit 69. Plate voltage for the multivibrator 78 is applied to a cathode of a switch tube 85 in the second sweep amplitude measuring circuit 67 and to the plate of a switch tube 87 of the third sweep amplitude measuring circuit 68. The switch tube 85 is connected to a storage condenser 86 that in turn is connected with a clipper amplifier 90 in the second residual attenuation correction voltage circuit 70. The switch tube 87 is connected through a storage condenser 88 to a clipper amplifier 91 in the third residual attenuation correction voltage circuit 71.

The second trigger forming circuit 54 comprises in series connection an integrator 100, clipper amplifiers 101 and 102, a differentiator 103, followed by another clipper amplifier 104. The first trigger forming circuit 61 comprises connected consecutively in series a clipper amplifier 110, a differentiator 111 and another clipper amplifier 112. Signal from the intermediate frequency or I. F. preamplifier 47 is passed over connector 115 to such other rain intensity channels as may be in the system of multiple rain intensity channels also disclosed in my copending application Serial Number 184,507 filed September 12, 1950 for Device to Permit Radar Contour Mapping of Rain Intensity in a Rain Storm, now U. S. Patent 2,656,531 issued October 20, 1953. The connector 115 leads to a desired number of gain channels connected in parallel and each gain channel consisting of corresponding components indicated by corresponding numerals primed. The gains needed in the amplifiers 48, 48' and 48" will be the inverse of the rainfall intensities that supply echo signals to the input end of the circuitry. Presentations upon an indicator 120 are drawn through a video amplifier 121 from the output from the limiter 53.

In the operation of the circuit shown in Fig. 1 let it be assumed initially that the storm being observed be read for three ranges of rain intensity and that the envelope of the signal echoes received back from the storm are represented by a simplified wave shape 130 in Fig. 2 of the drawings, wherein time, along the abscissa is plotted against amplitude or intensity of echo.

At time zero, very light rain echoes are received. The rain echoes from time zero increased in intensity until time 1 when rain echoes of moderate intensity begin to be received. Over the period 0 to 1, the average rain intensity at time 0.5 is that of light rain equivalent to a light rainfall of 1.25 mm. per hour. All signals received after time 1 are attenuated by the attenuation of light rain. If the attenuation factor be taken as K db/km. per mm. per hour of rainfall, then all signal amplitudes after time 1.0 are decreased by the factor 1.25 K db/km.

The circuit in Fig. 1 is corrected for this decrease in signal amplitude by a saw tooth voltage 131 in Fig. 2, started at time 1.0 as indicated. The saw tooth voltage 131 is of a slope proportional to the factor 1.25 K db/km. The saw tooth voltage 131 is applied through a first sweep amplitude measuring circuit 66 and lead 72 back to the I. F. preamplifier 47 where it increases the voltage gain proportionately to the amount of the signal attenuation.

The I. F. preamplifier 47 applies its output to a plurality of gain channel input intermediate frequency gain amplifiers 48, 48' and 48" etc. that are separately biased to admit signals of increasingly greater amplitudes into the channels following the gain amplifiers. Signal of low amplitude from a light rain is given a high gain by the I. F. amplifier 48 and is passed in part to a light rain channel and the remainder of the output from the I. F. high gain amplifier 48 is passed to another amplifier 51 the output of which is clipped both above and below in a limiter 53. Output from the limiter 53 is divided, part going to a trigger forming circuit 54 and the rest passed to an amplifier 121 for presentation on an indicator 120. The trigger forming circuit 54 passes its output to a sweep generator time control circuit 63, that derives its input from the trigger forming circuit 61 following the I. F. high gain amplifier 48, and in parallel to a number of first residual attenuation correction voltage circuits 69, 70 and 71 etc. conforming in number with the number of channels in the circuitry. The sweep generator time control circuit 63 also derives input from the trigger forming circuit 61 and divides its output between a saw tooth sweep generator 65 and a first sweep amplitude measuring circuit 66. The first residual continuation voltage circuit 69 passes the light rain curve 131 to the first sweep amplitude measuring circuit 66. Output from the first sweep amplitude measuring circuit 66 impressed on the output from the saw tooth sweep generator 65 as a correction voltage is returned by the conductor 72 to the I. F. preamplifier 47 from which it effects the presentation on the indicator 120 from the channel fed by the high gain I. F. amplifier 48.

The above sequence for a light rain is duplicated for other rain intensities, such as medium, heavy, etc., respectively feeding modulation into the I. F. preamplifier 47 for its influence according to its respective channel on the presentation at the indicator 120.

In the time interval between 1 and 2 the average rain intensity is moderate or 5.0 mm. per hour, after having been corrected for attenuation due to light rain. All echoes after time 2 have been attenuated 1.25 K plus 3.75 K db/km., or a total of 5.0 K db/km. At time 2 another sawtooth voltage 132 is started from the second residual attenuation correction voltage circuit 70. The slope of this voltage wave 132 is proportional to 3.75 K db/km. and is added to the first correction wave as shown in curve 134, Fig. 2, between time 2 and 3.

In the time interval between 2 and 7 the average rain intensity is heavy or is 12.5 mm. per hour and is corrected for attenuation due to light and moderate rain. At time 3 an additional saw-tooth voltage 133 from the third residual attenuation correction voltage circuit 71 (having a slope proportional to 12.5–5.0) K or 7.5 K db/km. is applied to the preamplifier 47 along the correction voltage conductor 72 and the sum of curves 131, 132 and 133 produces the resultant curve 134 shown in Fig. 2.

At time 7 the radar pulse has penetrated the heavy rain and, as shown by curve 134, the total attenuation increases less in amplitude with increase in time. The attenuation due to the thickness of heavy rain remains constant after time 7. Thus the correction voltage must also be of constant amplitude on sawtooth voltage 133 after time 7 or the attenuation which increases at the rate of 7.5 K db/km. levels off at time 7. At time 8 the radar pulse has passed through all the moderate rain so that the radar energy is no longer attenuated by an increasing thickness of moderate rain. The correction voltage curve 132 levels out at time 8. The attenuation correction voltage for light rain sawtooth voltage curve 131 increases uniformly to time 9 after which the voltage levels off until the pulse has penetrated the complete storm.

In order that those echoes which are at greater ranges but at the same azimuth as the first storm may be represented at true intensity the total attenuation due to the intervening storm must be compensated for. The attenuation correction voltages must therefore remain constant for the duration of the sweep.

The combined attenuation correction voltage appears as the wave form curve 134 in Fig. 2. The use of linear sawtooth voltages assumes that the amplifier to which this wave form 134 is applied has a characteristic such as to permit the voltage amplification to vary proportionately to applied voltage variations.

The operation of the attenuation correction circuit shown in Fig. 1 may be understood by reference to corresponding wave forms shown in Fig. 3.

In a multiple channel circuit the voltage output of each I. F. amplifier 48 channel is represented by a simplified wave form 135 clipped at dash line level 136 in Fig. 3. In the output of the intermediate frequency or I. F. amplifier 48, the trigger forming circuit 61 forms a series of positive pulses 140 in Fig. 3, the first of which starts the sweep generator time control circuit 63 at a time 1 corresponding to the point just before the beginning of moderate rainfall. The time at which this trigger occurs may be made variable between the beginning of the light rain and the beginning of the moderate rain.

The sweep generator time control circuit 63 then starts the sawtooth sweep generator 65 and simultaneously turns on the sweep amplitude measuring circuit 66 for the first storm. The sawtooth sweep generator 65 puts out the voltage 149 in Fig. 3.

The second trigger forming circuit 54 takes the wave shape output of the limiter 53, that resembles in appearance the wave shape 135, and forms a trigger pulse 147 that occurs at time 9 just before the end of the light rain at the remote side of the storm. This trigger pulse 147 stops the sweep generator 65 and the sweep amplitude measuring circuit 66 at time 9. Simultaneously, the trigger at time 9 at the remote side of the storm starts the circuit which forms the residual attenuation correction voltage in circuit 69 for the first storm. The output from the residual attenuation correction voltage circuit 69 should have the same voltage amplitude as the maximum voltage amplitude reached by the sawtooth sweep voltage inasmuch as this value is proportional to the total attenuation that is attributable to the light rain in the storm. The amplitude of the output from the clipper amplifier 82 in the residual attenuation correction voltage circuit 69 is made to equal the peak of the sawtooth sweep by the application of a signal from the sweep amplitude measuring circuit 66 for the first storm.

It is desirable that the residual attenuation correction voltage for the first storm should last until the end of the sweep. The plate voltage supply for the residual attenuation correction voltage circuit is obtained by using the plan position indicator or P. P. I. un-blanking voltage which normally lasts for the duration of the sweep. As a consequence all echoes which are received after those from the first storm will be corrected for as well. The final correction voltage is represented by the solid line 155 in Fig. 3.

In the event a second rain storm lies along the same radar azimuth as the first storm and it is desired to channel its signals correctly according to rainfall intensity, then a second residual attenuation correction circuit 70, similar to circuit 69, and a second sweep amplitude measuring circuit 67, similar to circuit 66, are added as shown in Fig. 1.

The second residual attenuation correction circuit 70 is not to be triggered by the start trigger 117 at the end of the first storm and to avoid this result the second circuit 70 receives its plate voltage only after the corresponding circuit 69 from the first storm has started, occurring between multivibrator 76 and clipper amplifier 82 in Fig. 1, and indicated by wave shape 152 in Fig. 3.

In the meantime the second storm has started to be swept for signal and the sweep generator time control circuit 63 starts the sawtooth sweep generator 65 and simultaneously turns on the sweep amplitude measuring circuit 67 for the second storm. The signal is represented by the dashed line 151 in Fig. 3. In this event the sweep amplitude measuring circuit 67 goes into operation since its plate voltage has been applied at the same time it is supplied to the corresponding residual attenuation circuit 70.

In order to prevent sweep amplitude measuring circuit 66 from changing the residual attenuation voltage from the first storm, the circuit 66 is closed off immediately after the first storm by applying the same voltage which supplies the plates of the sweep amplitude measuring circuit 67 and the residual attenuation correction circuit 70 to the cathode of the sweep amplitude measuring circuit 66.

By adding the output of residual attenuation circuit 70 to that at point 72, the wave form shown at dashed line 156 is added to the output which would exist if only the first storm was present. In a similar manner any desired number of additional storms could be compensated for. The circuit 70 corrects for attenuation due to light rain when attached to an I. F. high gain amplifier channel in a multiple channel system. A corresponding circuit attached to another appropriate channel of a multiple channel system would correct for moderate rain; and likewise for rain of other degrees of intensity.

To obtain the positive trigger at time 1, the output of the intermediate frequency or I. F. amplifier 48 represented as wave shape 135 is first clipped very close to the top as indicated at dash line 136, Fig. 3. The clipping level may be made variable if preferred. The clipper output then consisting of the inverted and amplified peaks of the individual pulses represented by wave form 137 is then differentiated as wave form 139. The positive portion is then clipped, the negative being inverted as wave form 140 and is used to trigger the multivibrator 64 in the sweep generator time control circuit 63.

To obtain the positive trigger at time 9 wave form 147 in Fig. 3, corresponding to the end of the signal being put out by a particular intermediate frequency or I. F. amplifier, the output of the limiter 53, that is similar in wave form to wave 135 in Fig. 3 is integrated as wave form 141 and is clipped once as wave form 143 and a second time as wave form 145 to obtain a nearly equal wave ending very close to the end of the I. F. signal. This square wave is differentiated as wave form 146 and the positive pulse is clipped, leaving the negative pulse to be inverted and made positive as wave form 147. The resultant trigger pulse is then used to stop the sweep time control circuit as by wave forms 148 and 149 and start the residual attenuation correction circuits 69, 70 and 71 by being applied as the wave form 152 in Fig. 3, to the multivibrators 76, 77 and 78 therein, respectively in Fig. 1.

When the multivibrator 64 starts the sweep generator 65 it also supplies plate voltage to the switch tube 80 permitting it to conduct and to charge up the storage condenser 81 when the sawtooth signal is applied to the grid of switch tube 80.

The voltage on storage condenser 81 is proportional to the peak amplitude reached by the sawtooth sweep and acts as bias for the clipper amplifier 82. The clipper amplifier 82 thus clips the output of the multivibrator 76 as dash line 153 on wave form 152 so that its resultant output is a square wave, the amplitude of which is equal to the peak amplitude of the sawtooth sweep as indicated by the wave form 154 in Fig. 3.

The output wave form 154 of the multivibrator 76 is then applied as plate voltage to the multivibrator 77 of the residual attenuation correction circuit 70 so that it is ready to start when triggered by the pulse corresponding to the end of the wave train from the second storm.

Simultaneously, the output of the multivibrator 76 is applied as plate voltage to the switch tube 85 so that it may charge up the storage condenser 86 and to the cathode of the switch tube 80 to prevent it from operating during the second storm. In the event a third storm is to be read the method is similar to that described for the second storm.

In the described manner, up to three discontinuities in rain of the same intensity in one storm or in three storms along the same radar azimuth may be compensated for automatically. Duplicate circuits would be used to correct for other rain intensity ranges. The only differences in the correction circuits for the various channels of a multiple channel system would be the slopes of the sawtooth outputs.

The method and means described herein for indicating rain intensities minimizes the effects of range. The operation of the equipment is dependent upon an assumed value of mean rain attenuation. The use of the method and means described is directed toward the obtaining of pictures of rain intensity contours with a minimum of distortion and regardless of the side from which the radar views the storm. From these pictures rain attenuation factors are obtained. The addition of variable slope controls in the sawtooth sweep generators permit attenuation correction factors to be changed at will.

Where desirable, two similar radar sets may be mounted and operated at a distance apart such that the plan position indications may be presented simultaneously to an observer. Where both radar systems have comparable circuits the slopes of the attenuation correction voltages may be varied until the storm contour maps of both radar presentations are the same. The slopes of the attenuation correction voltage then indicates the true value of rain attenuation.

It is to be understood that the apparatus and method described herein have been submitted for the purposes of illustrating and explaining an operative embodiment of the present invention and that modifications may be made therein without departing from the scope of the present invention.

What I claim is:

1. A radar receiver circuit for storm density observations, comprising signal reception means inclusive of an intermediate frequency preamplifier, a plurality of gain channels receiving and separating by magnitude of signal amplitude their signal inputs from the output from said preamplifier, indicator means providing a presentation at the output end of said plurality of gain channels, rainfall attenuation correction signal producing means deriving its input from said plurality of gain channels and producing a plurality of rainfall attenuation correction signals applicable to said preamplifier for modifying the presentation on said indicator.

2. A radar receiving circuit for relative storm density area observations, comprising signal reception means inclusive of an intermediate frequency preamplifier, a plurality of substantially duplicate gain channels separately containing a gain amplifier and a limiter, an indicator providing a presentation from said gain channels, a plurality of substantially duplicate rain intensity channels deriving input from the gain amplifier and limiter of said gain channels to provide a correction voltage returned to said preamplifier for modifying the presentation on said indicator.

3. A radar receiver circuit for graduated storm density observations, comprising signal reception means inclusive of an intermediate frequency preamplifier, a plurality of gain channels receiving signal from said preamplifier and separating according to relative signal amplitude at a gain amplifier in the input end of each of said gain channels, a limiter in each of said gain channels limiting the positive and negative swing of amplified signal from said gain amplifier, an indicator providing a presentation of the outputs from said gain channels, a plurality of rain intensity channels separately receiving input from both the gain amplifier and the limiter of a corresponding gain channel and providing as output a correction voltage applicable to said preamplifier for modifying the presentation on said indicator at the output end of said gain channels.

4. A radar receiver circuit adapted for storm density observations, comprising signal reception means inclusive of an intermediate frequency preamplifier, a plurality of gain channels receiving input from said preamplifier at an intermediate gain amplifier for each channel receiving signal of a predetermined range of amplitude and having a divided output, a limiter in each of said gain channels, an indicator at the output end of said gain channels for presentation from said gain channels, a plurality of rain intensity graduated channels each of which has a first trigger forming circuit at a first receiving end to which is supplied input from the divided output of one of said intermediate frequency gain amplifiers, limiter means in each of said gain channels and having a divided output, a second trigger forming circuit in each of said rain intensity graduated channels and receiving its input from the limiter in one of said gain channels and having a divided output, a sweep generator time control circuit in each of said rain intensity channels and receiving its input from both said first and second trigger forming circuits and having a divided output, a saw tooth sweep generator generating a saw-tooth curve, a first residual attenuation correction voltage circuit receiving input from said second trigger forming circuit and having as output a rainfall attenuation correction signal curve, a first sweep amplitude measuring circuit to which the rainfall attenuation correction signal curve is passed and with said saw-tooth sweep generator output returning a correction voltage signal back to said intermediate preamplifier for passage thru one of said gain channels for presentation at said indicator.

References Cited in the file of this patent

UNITED STATES PATENTS

| | | |
|---|---|---|
| 2,427,219 | Luck | Sept. 9, 1947 |
| 2,435,960 | Fyler | Feb. 17, 1948 |
| 2,440,250 | Deloraine | Apr. 27, 1948 |
| 2,444,721 | Blaisdell | July 6, 1948 |
| 2,456,952 | Kleunder | Dec. 21, 1948 |
| 2,515,332 | Budenbom | July 18, 1950 |
| 2,532,347 | Stodola | Dec. 5, 1950 |